United States Patent
Boutami (10) Patent No.: US 10,884,225 B2
(45) Date of Patent: Jan. 5, 2021

(54) HIGHLY-FOLDING PENDULAR OPTICAL CAVITY

(71) Applicant: COMMISSARIAT A L'ENERGIE ATOMIQUE ET AUX ENERGIES ALTERNATIVES, Paris (FR)

(72) Inventor: Salim Boutami, Grenoble (FR)

(73) Assignees: COMMISSARIAT À L'ENERGIE ATOMIQUE, Paris (FR); ET AUX ENERGIES ALTERNATIVES, Paris (FR)

( * ) Notice: Subject to any disclaimer, the term of this patent is extended or adjusted under 35 U.S.C. 154(b) by 0 days.

(21) Appl. No.: 16/341,220

(22) PCT Filed: Oct. 10, 2017

(86) PCT No.: PCT/FR2017/052768
§ 371 (c)(1),
(2) Date: Apr. 11, 2019

(87) PCT Pub. No.: WO2018/069624
PCT Pub. Date: Apr. 19, 2018

(65) Prior Publication Data
US 2019/0258038 A1    Aug. 22, 2019

(30) Foreign Application Priority Data
Oct. 11, 2016    (FR) .................... 16 59812

(51) Int. Cl.
*G02B 19/00*       (2006.01)
*G01N 21/3504*    (2014.01)
(Continued)

(52) U.S. Cl.
CPC ....... *G02B 19/0085* (2013.01); *G01N 21/031* (2013.01); *G01N 21/3504* (2013.01); *G02B 17/004* (2013.01); *G02B 19/0023* (2013.01)

(58) Field of Classification Search
CPC .............. G02B 19/0085; G02B 17/004; G02B 19/0023; G01N 21/031; G01N 21/3504;
(Continued)

(56) References Cited

U.S. PATENT DOCUMENTS 3,748,014 A * 7/1973 Beiser .................... G02B 26/10
                                                                    359/201.1
4,058,699 A * 11/1977 van Vloten ........ B23K 26/0643
                                                                    219/121.73
(Continued)

FOREIGN PATENT DOCUMENTS

GB      2 316 172 A      2/1998
WO    2006/135212 A1   12/2006

*Primary Examiner* — Mohamed K Amara
(74) *Attorney, Agent, or Firm* — Oliff PLC (57) ABSTRACT

An optical cavity includes: a first elliptical mirror, having a first focal axis $A_1$, and designed to reflect a light beam emitted by a light source; a second elliptical mirror, having a second focal axis $A_2$; a third elliptical mirror, having a third focal axis $A_3$, the light beam exiting from the third elliptical mirror being designed to be received by a detector; a first reflector, arranged to reflect the light beam exiting from first elliptical mirror in the direction of the second elliptical mirror, and arranged to reflect the light beam exiting from second elliptical mirror in the direction of the third elliptical mirror; the first, second and third elliptical mirrors being arranged so that $A_1$, $A_2$ and $A_3$ have a point of intersection F, corresponding to a focus common to the first, second and third elliptical mirrors.

13 Claims, 2 Drawing Sheets

(51) Int. Cl.
*G02B 17/00* (2006.01)
*G01N 21/03* (2006.01)

(58) Field of Classification Search
CPC .... G01N 2201/066; G01N 21/03; H01S 3/08; H01S 3/005; H01S 3/0071; H01S 3/05; H01S 3/08081; H01S 3/105; H01S 3/0813; H01S 3/0816; H01S 3/083; G01J 3/42

See application file for complete search history.

(56) References Cited

U.S. PATENT DOCUMENTS

| | | | | |
|---|---|---|---|---|
| 5,440,143 A * | 8/1995 | Carangelo | ............ | G01N 21/031 250/573 |
| 5,546,222 A * | 8/1996 | Plaessmann | .......... | H01S 3/2325 359/346 |
| 5,615,043 A * | 3/1997 | Plaessmann | .......... | H01S 3/2325 359/346 |
| 5,880,834 A * | 3/1999 | Chrisp | ...................... | G01J 3/02 356/305 |
| 7,215,428 B2 * | 5/2007 | McNeal | ................ | G01N 21/031 356/246 |
| 7,777,887 B2 * | 8/2010 | Pralle | ................. | G01N 21/0303 356/432 |
| 7,817,274 B2 * | 10/2010 | Zhang | ...................... | G01J 3/02 356/328 |
| 7,936,455 B2 * | 5/2011 | Beardsley | ............. | G01J 3/0262 356/318 |
| 8,390,806 B1 * | 3/2013 | Subramanian | ........ | G01J 3/0259 356/328 |
| 8,411,268 B2 * | 4/2013 | Cook | ........................ | G01J 3/14 250/339.02 |
| 8,462,347 B2 * | 6/2013 | Phillips | ..................... | G01J 3/02 356/437 |
| 8,564,775 B2 * | 10/2013 | Wein | ...................... | G02B 6/2931 356/326 |
| 2003/0058439 A1 | 3/2003 | Martin | | |
| 2007/0195319 A1 * | 8/2007 | Kachanov | ................. | G01J 3/42 356/300 |
| 2008/0170311 A1 * | 7/2008 | Yafuso | ................. | G02B 17/061 359/852 |
| 2009/0110016 A1 * | 4/2009 | Markillie | ........... | G02B 27/0927 372/38.05 |
| 2009/0262346 A1 * | 10/2009 | Egloff | ....................... | G01J 3/02 356/326 |
| 2013/0114077 A1 * | 5/2013 | Zhang | ................... | G01N 33/48 356/328 |
| 2013/0322475 A1 * | 12/2013 | LaComb | ................... | H01S 3/08 372/35 |
| 2014/0268136 A1 * | 9/2014 | Pawluczyk | ............... | G01J 3/28 356/326 |
| 2015/0108370 A1 * | 4/2015 | Gunter | ...................... | F21V 7/04 250/492.1 |
| 2015/0192513 A1 | 7/2015 | Nicoletti et al. | | |
| 2015/0241277 A1 * | 8/2015 | Correns | ................ | G01J 3/0259 356/305 |
| 2019/0271652 A1 * | 9/2019 | Zhao | .................... | G01N 21/718 |

* cited by examiner

HIGHLY-FOLDING PENDULAR OPTICAL CAVITY

FIELD OF THE INVENTION

The invention relates to the technical field of optical cavities. The invention finds its application in particular in spectroscopic sensors. A spectroscopic sensor comprises an optical cavity, a light source emitting a light beam, and a detector of the light beam. The light source can for example be a heat source or a quantum cascade laser. The following applications can be cited as examples: fluid sensors, particle sensors, biological sensors etc.

More precisely, a Non-Dispersive InfraRed (NDIR) sensor to detect a fluid such as a gas can be cited. The infrared light source is preferentially a heat source. What is meant by "infrared" is a wavelength comprised between 0.78 µm and 12 µm. The infrared detector can for example be a bolometer or a pyrometer. The preferentially envisaged application is detection of a gas, for example $CO_2$, in reliable manner in an industrial environment, the detection conventionally being a threshold detection. Another possible application is analysis of a gas, implying precise, selective, and stable quantitative measurements in order to obtain an analysis of composition, or even individual detection of the $CO_2$ charge of the breathed air. Such an NDIR sensor can be integrated in a portable system such as a mobile phone, a computer, a camera etc. The invention can also find its application in fixed systems for home automation, analysis of the quality of the inside and outside air, industrial detectors etc.

The operating principle of an NDIR sensor consists in measuring the light intensity decrease, by means of the infrared detector, when the gas to be detected is contained inside the optical cavity. The gas inside the optical cavity does in fact absorb the infrared light at a wavelength (or on a spectral band) specific to the gas to be detected. To do this, when the light source is a heat source, the infrared detector is conventionally provided with a suitable filter to filter said predefined wavelength (or spectral band).

For example, assuming the distribution of the gas molecules to be uniform, Beer-Lambert's law gives a formula for the transmittance T of light through a gas:

$$T=\exp(-\sigma Nl)$$

where:
σ is the absorption cross-section of a gas molecule,
N is the number of gas molecules per volume unit,
l is the interaction length between the gas and light.

For example purposes, for $CO_2$, the interaction length l is preferentially comprised between a few mm and several tens of cm.

A compact, inexpensive NDIR sensor with a low electrical consumption is sought to be provided. As a great compactness is required, on account of the large interaction length (up to several tens of cm), it is not possible to use an optical cavity with a direct path between the light source and the infrared detector, including in the presence of lenses. What is meant by "direct path cavity" is a cavity operating without any mirrors able to fold the light beam.

STATE OF THE PRIOR ART

It is known to fold an optical cavity in the sense that at least one mirror is arranged in the optical cavity to guide a light beam emitted by a light source along an indirect path originating from successive reflection(s) on the mirror(s).

A first optical cavity known from the state of the art comprises an elliptical mirror designed to reflect a light beam emitted by a light source. The light source is located at a focus of the elliptical mirror, and a detector is located at the other focus of the elliptical mirror.

In this way, if the geometrical optics model is considered, the light rays emitted by the light source pass through the optical cavity twice.

A second optical cavity known from the state of the art, in particular from the document FR 3016214 (hereinafter D1), comprises:
  a plane mirror designed to reflect a light beam emitted by a light source;
  a spherical mirror arranged to reflect the light beam exiting from the plane mirror, and having an optical axis orthogonal to the plane mirror.

The light source can be located at the point of intersection between the spherical mirror and the optical axis. The detector can be located at the point of intersection between the plane mirror and the optical axis. If the geometrical optics model is considered, the plane mirror and the spherical mirror of D1 are configured so that the light rays emitted by the light source pass through the optical cavity three times (§ 0019).

Such optical cavities of the state of the art are not entirely satisfactory in so far as the light beam (i.e. the whole set of light rays) emitted by the light source takes a limited number of paths inside the optical cavity between the light source and detector. When a high interaction length is required, for example to increase the sensitivity of the sensor or on account of the nature of the gas to be detected, this limited number of paths requires the dimensions of the optical cavity to be increased, to the detriment of the required compactness. A compact and highly-folded optical cavity, i.e. allowing a large number of passages of the light beam inside the cavity between the light source and detector, is therefore required. In other words, an optical cavity allowing a high ratio between the optical path of the light beam and the surface of the optical cavity is sought to be achieved.

SUMMARY OF THE INVENTION

The object of the invention is to totally or partially remedy the above-mentioned shortcomings. For this purpose, the object of the invention is to provide an optical cavity comprising:
  a first elliptical mirror, having a first focal axis noted $A_1$, and designed to reflect a light beam emitted by a light source;
  a second elliptical mirror, having a second focal axis noted $A_2$;
  a third elliptical mirror, having a third focal axis noted $A_3$, the light beam exiting from the third elliptical mirror being designed to be received by a detector;
  a first reflector, arranged to reflect the light beam exiting from the first elliptical mirror to the second elliptical mirror, and arranged to reflect the light beam exiting from the second elliptical mirror in the direction of the third elliptical mirror;
  the first, second and third elliptical mirrors being arranged so that $A_1$, $A_2$ and $A_3$ have a point of intersection, noted F, corresponding to a focus common to the first, second and third elliptical mirrors.

Such a geometric configuration of the three elliptical mirrors thereby enables a large number (relatively to the state of the art) of paths of the light beam inside the optical cavity according to the invention, between the light source and detector, while at the same time preserving a compact optical cavity. The properties of an ellipse do in fact lead to flattening of the light rays propagating via the focuses. The flattening can be quantified by the ellipticity ε of the ellipse the formula of which is ε=1−b/a, where a is the semi-major axis of the ellipse and b is the semi-minor axis of the ellipse. The more the ellipse is flattened, the closer the ellipticity is to 1. The light rays can thus cover the greatest possible distance inside the optical cavity. To do this, the light source is designed to be positioned at the focus of the first elliptical mirror different from F and the detector is designed to be positioned at the focus of the third elliptical mirror different from F. The optical cavity according to the invention is a pendular cavity in the sense that the light rays successively reflected by the second elliptical mirror move between one end and the opposite end of the second elliptical mirror, while being flattened.

Definitions

What is meant by "exiting from" is that the light beam can:
exit directly from the mirror after reflecting with the latter, or
exit from the mirror after reflecting with the latter, and then interact with an entity present on the optical path, on leaving the mirror.

What is meant by "focal axis" is the axis passing through the focuses of the elliptical mirror. The major axis of the ellipse (the ellipse being defined by the elliptical mirror) extends in the direction of the focal axis. More precisely, the focuses of the elliptical mirror extend in a plane defined by two directions:
a first direction corresponding to the focal axis, and
a second direction along the thickness of the elliptical mirror, or along the thickness of the optical cavity.

The cavity according to the invention can comprise one or more of the following features.

According to one feature of the invention, $A_2$ and $A_3$ are identical.

One advantage procured in this way is the possibility for the third elliptical mirror to reflect the grazing light rays exiting from the second elliptical mirror in the direction of the detector.

According to one feature of the invention, the half-line $FA_3$ designed to be directed towards the detector and the half-line $FA_1$ designed to be directed towards the light source form an angle, noted α, comprised between 45° and 120°.

A twofold advantage is thus procured:
the light rays reflected by the second elliptical mirror cannot return to the first elliptical mirror and the light source, and
the grazing light rays can exit from the second elliptical mirror after a high number of successive reflections so as to obtain a high degree of folding of the optical cavity.

According to one feature of the invention, the angle α is comprised between 45° and 90°, preferably equal to 90°.

In this way, one advantage procured by the [45°-90°] range as compared with the [45°-120°] range is to obtain a more compact optical cavity. Furthermore, one advantage procured by the angle α equal to 90° is to maximise the distance covered by the light rays inside the optical cavity.

According to one feature of the invention, the cavity according to the invention comprises a second reflector arranged to reflect the light beam exiting from the second elliptical mirror in the direction of the first reflector, the first reflector being arranged to reflect the light beam exiting from the second reflector in the direction of the third elliptical mirror.

One advantage thus procured by the second reflector is to replace a part of the second elliptical mirror. It is therefore possible to eliminate said part of the second elliptical mirror in order to increase the compactness of the optical cavity without modifying the sensitivity of the sensor.

According to one feature of the invention, the second reflector is a plane mirror.

One advantage procured in this way is the simplicity of producing such a reflector.

According to one feature of the invention, the second reflector extends in the continuation of the first elliptical mirror in the longitudinal direction parallel to $A_1$ and presents a dimension, noted $d_2$, in the longitudinal direction and starting from the second focal axis verifying:

$$d_2 \geq \frac{b^2}{2a}$$

where:
a is the semi-major axis of the second elliptical mirror,
b is the semi-minor axis of the second elliptical mirror.

One advantage thus procured by such a dimension $d_2$ is to ensure receipt of a maximum amount of light rays exiting from the second elliptical mirror, in order to send the latter back to the first reflector. When the second reflector extends in the continuation of the first elliptical mirror, the value $$d_2 = \frac{b^2}{2a}$$

enables the first elliptical mirror to collect a maximum amount of light rays originating from the light source, when the light source is not directive.

According to one feature of the invention, the first reflector is a plane mirror.

One advantage procured in this way is the simplicity of producing such a reflector.

According to one feature of the invention, the first reflector extends in the direction $A_2$ and presents a dimension, noted $d_1$, along $A_2$ verifying:

$$d_1 \geq 2c$$

where c is the distance between the centre of the second elliptical mirror and the common focus F.

One advantage procured by such a dimension $d_1$ is to ensure receipt of a maximum amount of light rays exiting from the first elliptical mirror, the second elliptical mirror, and the second reflector when the latter is present.

According to one feature of the invention, the second elliptical mirror has an ellipticity ε verifying 0<ε<0.25.

One advantage procured by such an elliptical mirror is the possibility of improving the aliasing of the optical cavity, in other words the number of passages of the light rays inside the optical cavity after successive reflections. Such an elliptical mirror tends towards the behaviour of a spherical mirror when ε tends to 0. However, the focuses of the elliptical mirror are not identical in order to keep a pendular cavity in the sense that the light rays successively reflected by the second elliptical mirror move between one end of the second elliptical mirror and the opposite end of the latter, while being flattened.

According to one feature of the invention, the optical cavity comprises two opposite reflecting ends designed to reflect the light beam and arranged on each side of the first, second and third elliptical mirrors and of the first reflector so as to form a waveguide.

Such reflecting ends form a waveguide arranged to guide the light beam along the thickness of the optical cavity. The applicant observed that it is still possible to conjugate the light source with the detector in the plane of the optical cavity, in spite of the additional presence of such a waveguide arranged in a perpendicular direction to the plane of the cavity. One advantage procured by such reflecting ends is therefore:

- to increase the optical efficiency of the optical cavity as compared with the state of the art, or
- to enable the thickness of the optical cavity to be reduced (gain in compactness) compared with the state of the art for the same optical efficiency.

However, an optical cavity of the state of the art enables a compact sensor to be obtained in the plane of the optical cavity, but not in the thickness of the optical cavity. The thickness of the optical cavity is in fact dictated by the thickness of the light source. A reduction of the thickness of the optical cavity leads to a reduction of the size of the light source and thereby to a loss of optical efficiency. One possibility of compensation would be to increase the power of the light source, to the detriment of the electrical consumption.

It is a further object of the invention to provide a spectroscopic sensor comprising:

- an optical cavity in accordance with the invention, the first elliptical mirror presenting a focus, noted $F_1$, different from the common focus F, the third elliptical mirror presenting a focus, noted $F_3$, different from the common focus F;
- a light source, designed to emit a light beam and located at the focus $F_1$;
- a detector, located at the focus $F_3$ to receive the light beam exiting from the third elliptical mirror.

BRIEF DESCRIPTION OF THE DRAWINGS

Other features and advantages will become apparent from the detailed description of the different embodiments of the invention, the description being accompanied by examples and referring to the appended drawings.

What is meant by "transverse" is a direction perpendicular to the direction (noted Z) passing through the thickness of the optical cavity. The cutting plane is noted (X, Y) in the figures and corresponds to the plane of the optical cavity.

DETAILED DESCRIPTION OF THE EMBODIMENTS

Identical parts or parts performing the same function will bear the same reference numerals for the different embodiments, for the sake of simplification.

One object of the invention is to provide an optical cavity 1 comprising:

- a first elliptical mirror $M_1$, having a first focal axis noted $A_1$, and designed to reflect a light beam 2 emitted by a light source S;
- a second elliptical mirror $M_2$, having a second focal axis noted $A_2$;
- a third elliptical mirror $M_3$, having a third focal axis noted $A_3$, the light beam 2 exiting from third elliptical mirror $M_3$ being designed to be received by a detector D;
- a first reflector $R_1$, arranged to reflect light beam 2 exiting from first elliptical mirror $M_1$ in the direction of second elliptical mirror $M_2$, and arranged to reflect light beam 2 exiting from second elliptical mirror $M_2$ in the direction of third elliptical mirror $M_3$;

first, second and third elliptical mirrors $M_1$, $M_2$, $M_3$ being arranged so that $A_1$, $A_2$ and $A_3$ have a point of intersection, noted F, corresponding to a focus common to first, second and third elliptical mirrors $M_1$, $M_2$, $M_3$.

Elliptical Mirrors

The focuses of first, second and third elliptical mirrors $M_1$, $M_2$, $M_3$ extend in the direction of the thickness of optical cavity 1 (direction Z). Each elliptical mirror $M_1$, $M_2$, $M_3$ has a focal axis $A_1$, $A_2$, $A_3$. The two focuses of an elliptical mirror $M_1$, $M_2$, $M_3$ extend in a plane defined by two directions:

- a first direction corresponding to the focal axis of the corresponding elliptical mirror and
- a second direction Z in the plane of the thickness of the corresponding elliptical mirror, or in the plane of the thickness of optical cavity 1.

Figure 1:
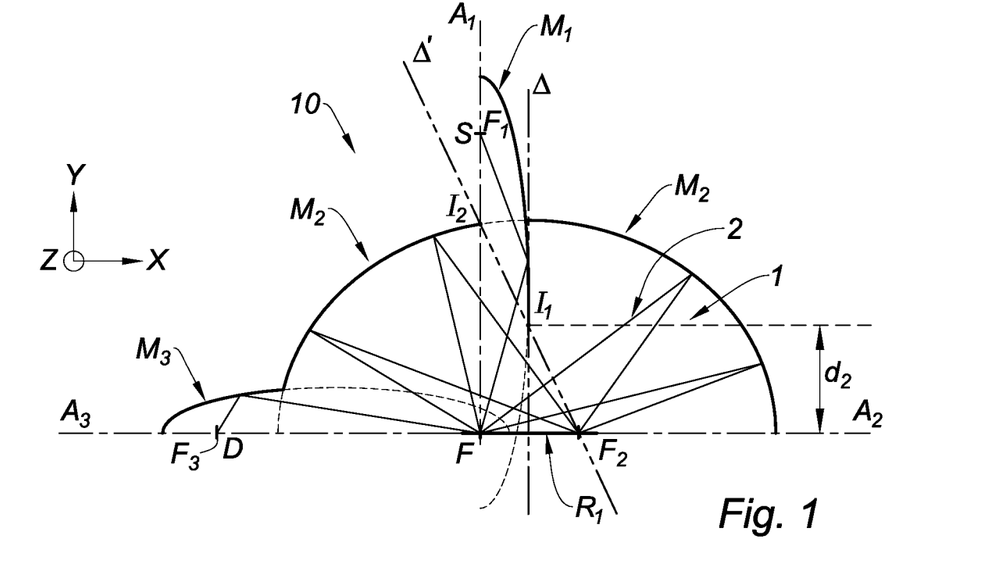
FIG. 1 is a schematic view in transverse cross-section of a spectroscopic sensor comprising a optical cavity according to a first embodiment of the invention. The dotted lines extending the elliptical mirrors are construction lines illustrating a semi-ellipse. The dotted and dashed lines correspond to the focal axes of the elliptical mirrors.
Figure 2:
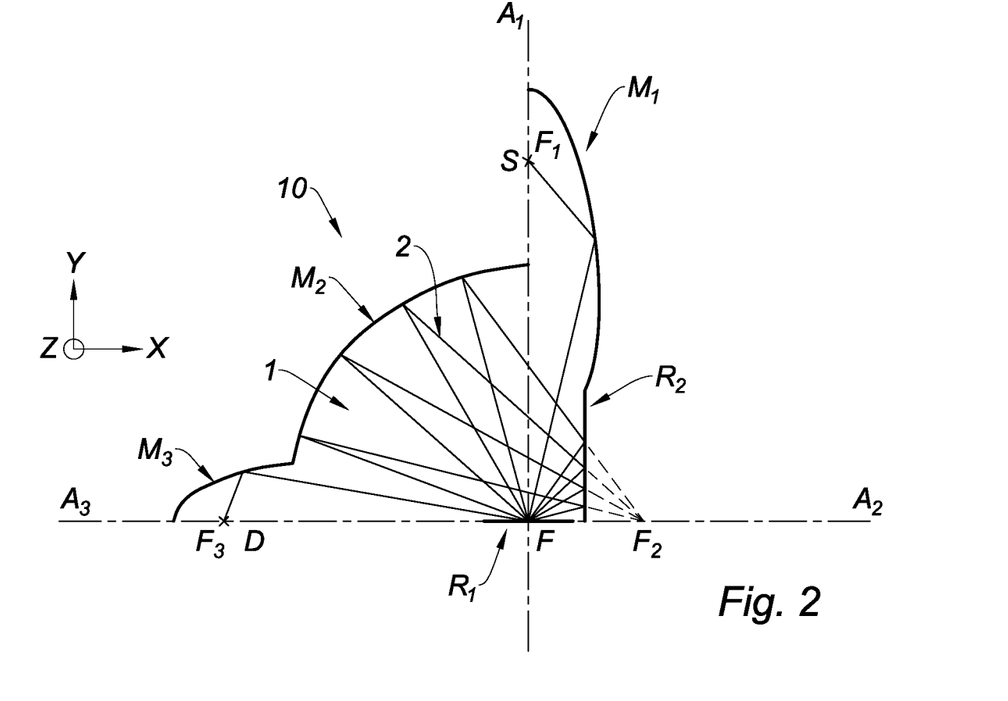
FIG. 2 is a schematic view in transverse cross-section of a sensor, comprising an optical cavity according to a second embodiment of the invention.
Figure 3:
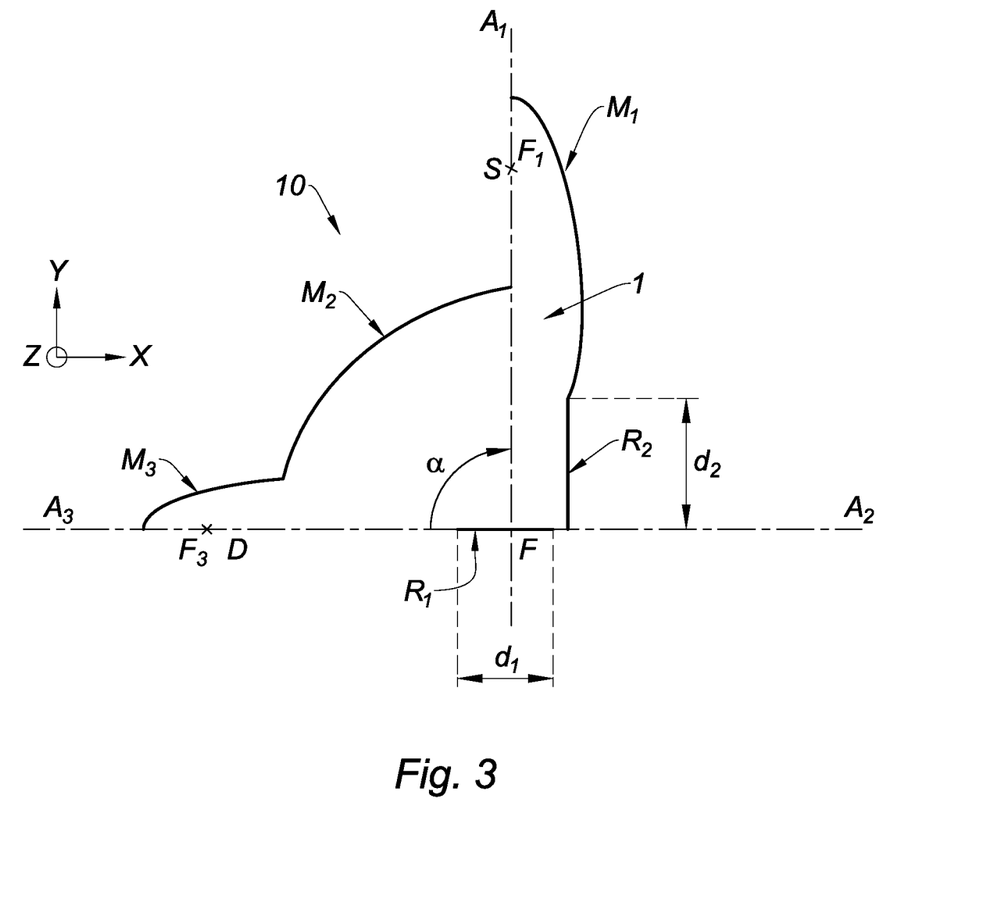
FIG. 3 is a similar view to FIG. 2, without plotting of the light beams, illustrating the geometric parameters of the optical cavity.

$A_2$ and $A_3$ are advantageously identical. In other words, the planes in which the focuses of second and third elliptical mirrors $M_2$, $M_3$ extend are advantageously identical. In other words, the focuses of second and third elliptical mirrors $M_2$, $M_3$ are advantageously coplanar. As illustrated in FIGS. 1 to 3, focuses F, $F_2$ of second elliptical mirror $M_2$ and focuses F, $F_3$ of third elliptical mirror $M_3$ advantageously extend in the plane (X, Z).

Half-line $FA_3$ designed to be directed towards detector D and half-line $FA_1$ designed to be directed towards light source S advantageously form an angle, noted a, comprised between 45° and 120°. In other words, the planes in which the focuses of third and first elliptical mirrors $M_3$, $M_1$ extend form a dihedral angle α, comprised between 45° and 120°. Angle α is advantageously comprised between 45° and 90°, and preferentially equal to 90°. As illustrated in FIGS. 1 to 3, plane (X, Z) in which focuses F, $F_3$ of third elliptical mirror $M_3$ extend preferentially forms a dihedral angle equal to 90° with plane (Y, Z) in which focuses F, $F_1$ of first elliptical mirror $M_1$ are located.

In the embodiment illustrated in FIG. 1, second elliptical mirror $M_2$ comprises first and second parts arranged on each side of first elliptical mirror $M_1$. In other words, first elliptical mirror $M_1$ is inserted between the first and second parts of second elliptical mirror $M_2$. As can be seen in FIG. 1, the ellipse defined by second elliptical mirror $M_2$ presents an axis of symmetry Δ extending in direction Y. The first and second parts of second elliptical mirror $M_2$ extend in direction X on each side of axis of symmetry Δ. The first part of second elliptical mirror $M_2$ is preferentially in contact with third elliptical mirror $M_3$. The second part of second elliptical mirror $M_2$ is preferentially in contact with first elliptical mirror $M_1$. First elliptical mirror $M_1$ is arranged relatively to second elliptical mirror $M_2$ so as not to reflect light beam 2 exiting from the first part of second elliptical mirror $M_2$. To do this, as illustrated in FIG. 1, let us consider:

$I_2$ the end of the first part of second elliptical mirror $M_2$ situated facing first elliptical mirror $M_1$, located on first focal axis $A_1$, $\Delta'$ the axis passing through $I_2$ and $F_2$, $I_1$ the end of the first elliptical mirror $M_1$ situated facing first reflector $R_1$, $d_2$ the distance between $I_1$ and second focal axis $A_2$.

First elliptical mirror $M_1$ is advantageously arranged relatively to second elliptical mirror $M_2$ so that $I_1$ belongs to $\Delta'$, with $d_2$ verifying the relation $$d_2 = \frac{b^2}{2a},$$

where a is the semi-major axis of second elliptical mirror $M_2$ and b is the semi-minor axis of second elliptical mirror $M_2$. First elliptical mirror $M_1$ can thus collect a maximum amount of light rays originating from light source S (when light source S is not directive), without reflecting light beam 2 exiting from the first part of second elliptical mirror $M_2$. First elliptical mirror $M_1$ can be arranged relatively to second elliptical mirror $M_2$ so that $$d_2 > \frac{b^2}{2a},$$

with the drawback of a loss of the number of light beams received by first elliptical mirror $M_1$ when light source S is not directive (e.g. isotropic) such as a heat source. This drawback can be overcome by using a directive light source S such as a quantum cascade laser.

In the embodiment illustrated in FIG. 2, the second part of second elliptical mirror $M_2$ is eliminated.

For non-restrictive example purposes, the dimensions (a, b) of the ellipses of first, second and third elliptical mirrors $M_1$, $M_2$, $M_3$ are set out in the table below:

| Mirror | Dimension | |
|---|---|---|
| | a (μm) | b (μm) |
| First elliptical mirror $M_1$ | 79.6 | 48 |
| Second elliptical mirror $M_2$ | 100 | 90 |
| Third elliptical mirror $M_3$ | 45 | 15 | where "a" is the semi-major axis, and "b" is the semi-minor axis. Dimension "c" of the ellipses, which is the distance between the centre and a focus of the corresponding ellipse, can be calculated by means of the following formula: $c=\sqrt{a^2-b^2}$.

The dimensions (a, b, c) of the ellipses of first, second and third elliptical mirrors $M_1$, $M_2$, $M_3$ are chosen in particular according to the length of interaction I required between the fluid and light beam 2 when the envisaged application is a fluid sensor.

Each elliptical mirror $M_1$, $M_2$, $M_3$ advantageously has a reflection coefficient of light beam 2 greater than or equal to 75% for any angle of incidence. Said reflection coefficient is advantageously greater than or equal to 80%, preferentially greater than or equal to 85%, more preferentially greater than or equal to 90%, for any angle of incidence. Advantageously, the reflection coefficient of light beam 2 is greater than or equal to 95%, preferably greater than or equal to 98% for any angle of incidence smaller than 45°. What is meant by "reflection coefficient" is the reflection coefficient in intensity, for an angle of incidence comprised between 0° (normal incidence) and 90° (grazing incidence), for a given wavelength and taking account of the arithmetically averaged polarisations "s" and "p" when light source S is a heat source. The angle of incidence is the angle between the direction of propagation of light beam 2 and the normal to the reflecting surface of the corresponding elliptical mirror.

Second elliptical mirror $M_2$ advantageously has an ellipticity ε verifying $0<\varepsilon<0.25$.

Optical cavity 1 is advantageously devoid of lenses.

First Reflector

First reflector $R_1$ is advantageously a plane mirror. First reflector $R_1$ preferentially extends in direction $A_2$, and presents a dimension noted $d_1$, along $A_2$, verifying:

$$d_1 \geq 2c$$

where c is the distance between the centre of the second elliptical mirror and common focus F.

In the embodiment illustrated in FIG. 1, first reflector $R_1$ is arranged to reflect light beam 2 exiting directly from second elliptical mirror $M_2$ to third elliptical mirror $M_3$.

More precisely, first reflector $R_1$ is arranged to send light beam 2 exiting directly from second elliptical mirror $M_2$ back to second elliptical mirror $M_2$ until light beam 2 reaches third elliptical mirror $M_3$. The successive reflections of light beam 2 inside second elliptical mirror $M_2$ via first reflector $R_1$ can be qualified as pendular reflections. In other words, the light rays successively reflected by second elliptical mirror $M_2$ and by first reflector $R_1$ move between one end and the opposite end of second elliptical mirror $M_2$, while being flattened.

Second Reflector

In the embodiment illustrated in FIG. 2, optical cavity 1 advantageously comprises a second reflector $R_2$ arranged to reflect light beam 2 exiting from second elliptical mirror $M_2$ to first reflector $R_1$. First reflector $R_1$ is then arranged to reflect light beam 2 exiting from second reflector $R_2$ to third elliptical mirror $M_3$. First reflector $R_1$ is arranged to reflect light beam 2 exiting indirectly (i.e. after reflection with second reflector $R_2$) from second elliptical mirror $M_2$ to third elliptical mirror $M_3$. More precisely, first reflector $R_1$ is arranged to send light beam 2 exiting indirectly from second elliptical mirror $M_2$ back to second elliptical mirror $M_2$ until light beam 2 reaches third elliptical mirror $M_3$. The successive reflections of light beam 2 inside second elliptical mirror $M_2$ via first reflector $R_1$ and second reflector $R_2$ can be qualified as pendular reflections. In other words, the light rays successively reflected by second elliptical mirror $M_2$ and by first and second reflectors $R_1$, $R_2$ move between one end and the opposite end of second elliptical mirror $M_2$, while being flattened.

As stated above, in the embodiment illustrated in FIG. 2, the second part of second elliptical mirror $M_2$ is eliminated and is replaced by second reflector $R_2$.

Second reflector $R_2$ is advantageously a plane mirror. Second reflector $R_2$ preferentially extends in the continuation of first elliptical mirror $M_1$ in the longitudinal direction parallel to $A_1$, and presents a dimension, noted $d_2$, in the longitudinal direction and starting from second focal axis $A_2$ verifying:

$$d_2 \geq \frac{b^2}{2a}$$

where:
a is the semi-major axis of second elliptical mirror $M_2$,
b is the semi-minor axis of second elliptical mirror $M_2$.
Dimension $d_2$ corresponds to the distance $d_2$ between $I_1$ and second focal axis $A_2$ in the first embodiment illustrated in FIG. 1.

Second reflector $R_2$ is advantageously arranged so that $d_2$ verifies the relation $$d_2 = \frac{b^2}{2a},$$

where a is the semi-major axis of second elliptical mirror $M_2$ and b is the semi-minor axis of second elliptical mirror $M_2$. In this way, first elliptical mirror $M_1$ can collect a maximum amount of light rays originating from light source S (when the light source is not directive), without reflecting light beam 2 exiting from second elliptical mirror $M_2$.

Second reflector $R_2$ can be arranged so that $$d_2 > \frac{b^2}{2a},$$

with the drawback of a loss of the number of light rays received by first elliptical mirror $M_1$ when light source S is not directive (e.g. isotropic) such as a heat source. This drawback can be overcome by using a directive light source S such as a quantum cascade laser.

Waveguide

Optical cavity 1 advantageously comprises two opposite reflecting ends (not visible in the figures) designed to reflect light beam 2 and arranged on each side of first, second and third elliptical mirrors $M_1$, $M_2$, $M_3$ and of first reflector $R_1$ so as to form a waveguide. When optical cavity 1 comprises a second reflector $R_2$, the two reflecting ends are arranged on each side of first, second and third elliptical mirrors $M_1$, $M_2$, $M_3$ of first reflector $R_1$ and of second reflector $R_2$ so as to form a waveguide. The two reflecting ends guide light beam 2 in direction Z of the thickness of optical cavity 1. First, second and third elliptical mirrors $M_1$, $M_2$, $M_3$, first reflector $R_1$, and second reflector $R_2$ if applicable, join the two reflecting ends to one another.

Each reflecting end comprises a reflecting surface having a reflection coefficient of light beam 2 greater than or equal to 80%, preferably greater than or equal to 85%, more preferentially greater than or equal to 90%, for any angle of incidence. Advantageously, the reflection coefficient of light beam 2 is greater than or equal to 95%, preferably greater than or equal to 98% for any angle of incidence smaller than 45°. What is meant by "reflection coefficient" is the reflection coefficient in intensity, for an angle of incidence comprised between 0° (normal incidence) and 90° (grazing incidence), for a given wavelength and taking account of the arithmetically averaged polarisations "s" and "p" when light source S is a heat source. The angle of incidence is the angle between the direction of propagation of light beam 2 and the normal to the reflecting surface of the corresponding reflecting end. The reflecting surface of each reflecting end is preferentially flat. The flat reflecting surfaces of the reflecting ends are advantageously parallel.

The reflecting surface of each reflecting end is preferentially made from a metallic material. The metallic material is preferably selected from the group comprising gold, silver, aluminium and copper. The reflecting surface of each reflecting end is advantageously coated with a protective layer to prevent corrosion of the metallic material. The protective layer is advantageously made from a material selected from the group comprising $SiO_2$, SiN, $Si_3N_4$, a diamond-like carbon (DLC), polytetrafluoroethylene (PTFE), Pt, and TiN.

The two reflecting ends are preferentially both manufactured in the form of a plate. The plates are advantageously provided with openings shaped to receive light source S and detector D when the plates are placed in contact and fixed to one another. The two reflecting ends advantageously form plane mirrors.

Fabrication of the Optical Cavity

A first fabrication method of an optical cavity 1 according to the invention comprises the following steps:
a) providing first and second substrates made from a material, the material preferably being semi-conducting, more preferentially silicon;
b) hollowing out both the first and second substrates so as to form a bottom and to keep a superficial part;
c) assembling the first and second substrates so that:
the superficial parts kept in step b) form first, second and third elliptical mirrors $M_1$, $M_2$, $M_3$, first reflector $R_1$, and second reflector $R_2$ if applicable,
the bottoms form the opposite reflecting ends of optical cavity 1.

Step b) is advantageously performed by deep ion etching. Step b) is preferentially comprises a prior step consisting in depositing a photoresist on the surface of the first and second substrates. The recesses can then be obtained by photolithography and etching steps. Step b) is advantageously performed so that the recesses obtained enable flat bottoms to be formed. Hollowing out two substrates instead of one, in step b), enables the thickness of optical cavity 1 formed in step c) to be increased in order to reduce optical losses by reflection.

The reflecting surface of the reflecting ends is advantageously formed by deposition of a metallic material on the bottoms of the first and second substrates, the deposition preferably being performed by cathode sputtering. Deposition of the metallic material can also be performed by vacuum evaporation or by electrolysis. Deposition of the metallic material is performed before step c).

The reflecting surfaces of elliptical mirrors $M_1$, $M_2$, $M_3$ and of reflectors $R_1$, $R_2$ are advantageously formed by deposition of a metallic material on a lateral edge of a superficial part, the deposition preferably being performed by cathode sputtering. Deposition of the metallic material can for example be performed by vacuum evaporation or by electrolysis. Deposition of the metallic material is performed before step c).

The recesses of the first and second substrates obtained in step b) thereby enable two half-cavities to be obtained. Optical cavity 1 is formed in step c) by assembling the first and second substrates in order to join the two half-cavities. Forming a recess, for example by reactive ion etching, in a substrate made from semiconductor material is an inexpensive and viable solution as it enables an incline of the superficial parts relatively to the normal to the first and second substrates to be obtained that is typically about 1° to 2°.

A second method for fabricating an optical cavity 1 according to the invention comprises the steps:

a) providing first and second moulds respectively comprising an imprint of first and second parts each comprising a base capped by a superficial part;

b) injecting a plastic material in the first and second moulds so as to obtain the first and second parts;

c) assembling the first and second parts so that:
the superficial parts form first, second and third elliptical mirrors $M_1$, $M_2$, $M_3$, first reflector $R_1$, and second reflector $R_2$ if applicable,
the bases form the opposite reflecting ends of the optical cavity 1.

Step a) is preferably executed so that the first and second moulds each comprise a fixed part and a movable part. Step b) is preferably performed using an injection press.

The reflecting surface of the reflecting ends is advantageously formed by deposition of the metallic material on the bases of the first and second substrates, the deposition preferably being performed by cathode sputtering. Deposition of the metallic material can also be performed by vacuum evaporation or by electrolysis. Deposition of the metallic material is performed before step c).

The reflecting surfaces of elliptical mirrors $M_1$, $M_2$, $M_3$ and of reflectors $R_1$, $R_2$ are advantageously formed by deposition of the metallic material on a lateral edge of a superficial part, the deposition preferably being performed by cathode sputtering. Deposition of the metallic material can also be performed by vacuum evaporation or by electrolysis. Deposition of the metallic material is performed before step c).

Optical cavity 1 is thus formed in step c) by assembling the first and second parts so as to join two half-cavities each of which is demarcated by the base and the corresponding superficial part. Plastic injection is an inexpensive and viable solution in so far as shape defects are not detrimental to imaging light source S correctly on detector D.

Sensor

One object of the invention is to provide a spectroscopic sensor 10 comprising:

an optical cavity 1 in accordance with the invention, first elliptical mirror $M_1$ presenting a focus, noted $F_1$, different from the common focus F, third elliptical mirror $M_3$ presenting a focus, noted $F_3$, different from the common focus F;

a light source S, designed to emit a light beam 2 and arranged at focus $F_1$;

a detector D, arranged at focus $F_3$ to receive light beam 2 exiting from third elliptical mirror $M_3$.

The spectroscopic sensor 10 can be an infrared (e.g. non-dispersive) sensor to detect a fluid such as a gas. For non-restrictive example purposes, the gas can be selected from the group comprising carbon monoxide, carbon dioxide, at least one hydrocarbon, a hydrochlorofluorocarbon, a chlorofluorocarbon, nitrogen monoxide, nitrogen dioxide, sulphur dioxide, and ozone. The gas can also be selected from the following gases absorbing in a spectral absorption band comprised between 0.78 µm and 12 µm:

HF, HCl, $SO_3$, HBr, $H_2S$, COS, $C_2H_6$, $C_3H_8$, $C_4H_{10}$, $COCl_2$, $BF_3$, $CH_4$, $HNO_3$, a volatile organic compound (e.g. $C_6H_6$, $CH_3COCH_3$), $B_2H_6$, CO, $CS_2$, HCN, $WF_6$, $N_2O$, $NH_3$, $AsH_3$, a polycyclic aromatic hydrocarbon, benzene, toluene, the three xylene isomers, $C_2H_4O$, $BCl_3$.

The spectroscopic sensor 10 can also be a particle sensor or a biological sensor.

In the case of a particle sensor, light source S preferentially emits in the visible range. Light source S can be of LED type. The operating principle is as follows. The particles generate waves diffused in optical cavity 1 at random angles, which will not be refocused onto the detector due to successive absorptions in particular by elliptical mirrors $M_1$, $M_2$, $M_3$. This transmission loss measured by detector D is indicative of the type (index, size) and concentration of the particles in so far as the particles are generally not intrinsically absorbent.

Light Source

For non-restrictive example purposes, light source S can be a heat source or a quantum cascade laser. Light source S can be an infrared source. Light source S advantageously comprises an element, for example of filament type, in which an electric current is made to flow so that the element heats and emits an infrared radiation. The element presents a dimension, noted e, along the thickness of optical cavity 1 preferentially verifying:

100 µm≤e≤E≤1.5 mm, more preferentially 250 µm≤e≤E 1200 µm where E is the thickness of optical cavity 1.

The element preferentially presents the shape of a disk presenting a circular surface with a diameter of 250 µm (corresponding to dimension e). The axis of light source S is defined as being the normal to the circular surface. For non-restrictive example purposes, the disk can present a thickness of 400 nm along the axis of light source S. The image of light source S (i.e. the disk-shaped element) is a rectangle presenting a width of 250 µm and a height of 600 µm (the height corresponding to the direction Z along the thickness of optical cavity 1).

Detector

Detector D can be an infrared detector. The infrared detector can for example be a bolometer or a pyrometer. The infrared detector can present a surface sensitive to infrared rays. For non-restrictive example purposes, the sensitive surface can have the shape of a square with sides measuring 600 µm. Detector D is preferentially equipped with an optical bandpass filter centred on the spectral absorption band of the gas to be detected if this is the case, when light source S is a heat source. Detector D advantageously extends in direction Z, over the whole thickness of optical cavity 1, in order to receive a maximum amount of light rays, conjugation of the focuses of elliptical mirrors $M_1$, $M_2$, $M_3$ being imperfect along Z.

The invention is not limited to the embodiments set out herein. The person skilled in the art will be able to consider their technically operative combinations and to substitute equivalents for the latter.

The invention claimed is:

1. Optical cavity comprising:
a first elliptical mirror having a first focal axis noted $A_1$, and designed to reflect a light beam emitted from a first point toward a first reflector;
a second elliptical mirror having a second focal axis noted $A_2$; and
a third elliptical mirror having a third focal axis noted $A_3$, a light beam exiting from the third elliptical mirror being designed to be received at a second point;
wherein the first reflector is arranged to reflect a light beam coming from the first elliptical mirror toward the second elliptical mirror, and arranged to reflect a light beam coming from the second elliptical mirror toward the third elliptical mirror; and wherein the first, second and third elliptical mirrors being arranged so that $A_1$, $A_2$ and $A_3$ have a point of intersection, noted F, corresponding to a focus common to the first, second and third elliptical mirrors.

2. Optical cavity according to claim 1, wherein $A_2$ and $A_3$ are identical.

3. Optical cavity according to claim 1, wherein a half-line $FA_3$ designed to be directed towards the detector and a half-line $FA_1$ designed to be directed towards the light source form an angle, noted a, comprised between 45° and 120°.

4. Optical cavity according to claim 3, wherein the angle α is comprised between 45° and 90°.

5. Optical cavity according to claim 4, wherein the angle α is equal to 90°.

6. Optical cavity according to claim 1, further comprising a second reflector arranged to reflect the light beam coming from the second elliptical mirror toward the first reflector; the first reflector being arranged to reflect the light beam coming from the second reflector toward the third elliptical mirror.

7. Optical cavity according to claim 6, wherein the second reflector is a plane mirror.

8. Optical cavity according to claim 6, wherein the second reflector extends as a continuation of the first elliptical mirror, in a longitudinal direction parallel to $A_1$, and presents a dimension, noted $d_2$, in the longitudinal direction and starting from the second focal axis verifying:

$$d_2 \geq \frac{b^2}{2a}$$

where:
- a is a semi-major axis of the second elliptical mirror,
- b is a semi-minor axis of the second elliptical mirror.

9. Optical cavity according to claim 1, wherein the first reflector is a plane mirror.

10. Optical cavity according to claim 1, wherein the first reflector extends along the second focal axis $A_2$ and presents a dimension, noted $d_1$, along $A_2$ verifying:

$$d_1 \geq 2c$$

where c is a distance between the centre of the second elliptical mirror and the common focus F.

11. Optical cavity according to claim 1, wherein the second elliptical mirror has an ellipticity ε verifying $0 < \varepsilon < 0.25$.

12. Optical cavity according to claim 1, further comprising two opposite reflecting ends designed to reflect the light beam and separated by the first, second and third elliptical mirrors and by the first reflector so as to form a waveguide.

13. Spectroscopic sensor comprising:
an optical cavity according to claim 1, the first elliptical mirror presenting a focus, noted $F_1$, different from the common focus F, the third elliptical mirror presenting a focus, noted $F_3$, different from the common focus F;
a light source designed to emit a light beam and arranged at focus $F_1$;
a detector arranged at focus $F_3$ to receive the light beam exiting from the third elliptical mirror.

* * * * *